United States Patent
Borusu et al.

(10) Patent No.: US 11,872,950 B2
(45) Date of Patent: Jan. 16, 2024

(54) AIRBAG, AIRBAG ASSEMBLY AND METHOD FOR ASSEMBLING AN AIRBAG ASSEMBLY

(71) Applicant: Autoliv Development AB, Vargarda (SE)

(72) Inventors: Naga Borusu, Dachau (DE); Michal Lawniczak, Wroclaw (PL); Andreas Kalous, Dachau (DE); Steven Pavlovich, Auburn Hills, MI (US); Jakub Kwiecien, Spalice (PL)

(73) Assignee: Autoliv Development AB, Vårgårda (SE)

( * ) Notice: Subject to any disclaimer, the term of this patent is extended or adjusted under 35 U.S.C. 154(b) by 0 days.

(21) Appl. No.: 17/757,333

(22) PCT Filed: Dec. 16, 2020

(86) PCT No.: PCT/EP2020/086338
§ 371 (c)(1),
(2) Date: Jun. 14, 2022

(87) PCT Pub. No.: WO2021/122685
PCT Pub. Date: Jun. 24, 2021

(65) Prior Publication Data
US 2023/0022081 A1     Jan. 26, 2023

(30) Foreign Application Priority Data
Dec. 19, 2019   (DE) .......................... 102019135132.4

(51) Int. Cl.
*B60R 21/217*     (2011.01)
*B60R 21/203*     (2006.01)
(Continued)

(52) U.S. Cl.
CPC .......... *B60R 21/217* (2013.01); *B60R 21/203* (2013.01); *B60R 21/2334* (2013.01);
(Continued)

(58) Field of Classification Search
CPC .................................................... B60R 21/217
See application file for complete search history.

(56) References Cited

U.S. PATENT DOCUMENTS 5,226,671 A * 7/1993 Hill .................... B60R 21/23
280/743.1
5,642,900 A * 7/1997 Patel .................. B60R 21/217
112/475.08
(Continued)

FOREIGN PATENT DOCUMENTS

DE         4317740        12/1993
DE         4317740 A1     12/1993
(Continued)

OTHER PUBLICATIONS

Apr. 19, 2023 20/839/244.9—EP Office Action (5 pgs).
EP1186484—Machine Translation (15 pgs).
DE4317740A1—Machine Translation (8 pgs).

*Primary Examiner* — Nicole T Verley
(74) *Attorney, Agent, or Firm* — Matthew D. Thayne; Thayne and Davis LLC

(57) ABSTRACT

An airbag having an outer skin having an inner side and an outer side is described. The outer skin has an inflator attachment region in which an opening structure for an inflator is provided. The airbag is a part of an airbag assembly further having a flange and an inflator extending through the opening structure and being attached to the flange. In order to provide the possibility of an easy and automatable mounting process, the opening structure having at least two basically radially extending cut-outs, so that the attachment region has at least two flap sections being separated by the cut-outs. These flap sections can be pulled apart during the mounting process, such that the inflator can be attached to the flange.

13 Claims, 6 Drawing Sheets

Figure 5:
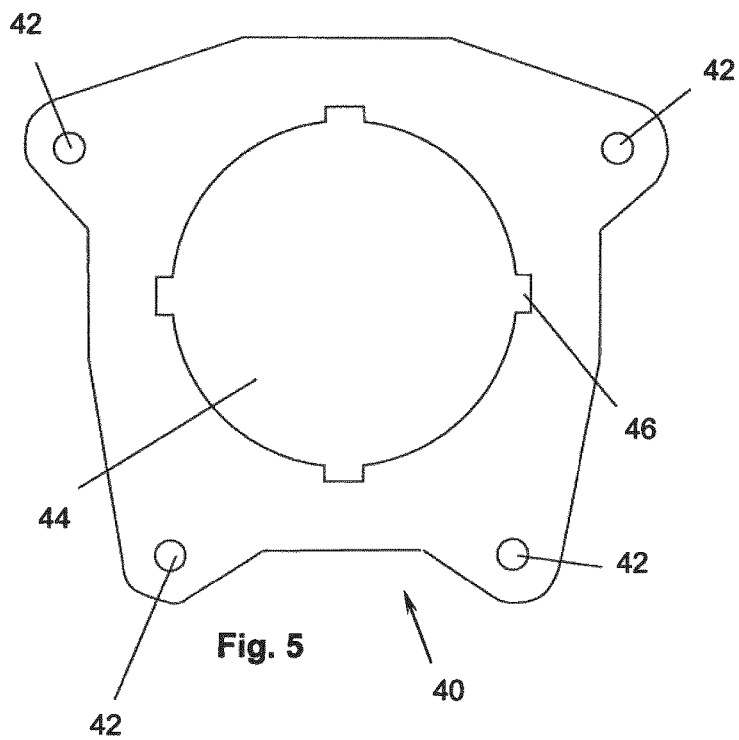

(51) Int. Cl.
*B60R 21/2334* (2011.01)
*B60R 21/235* (2006.01)

(52) U.S. Cl.
CPC ............... *B60R 2021/2172* (2013.01); *B60R 2021/23533* (2013.01)

(56) References Cited

U.S. PATENT DOCUMENTS

| | | | | |
|---|---|---|---|---|
| 6,312,007 | B1 * | 11/2001 | Paule | B60R 21/217 280/728.1 |
| 6,467,799 | B2 * | 10/2002 | Adomeit | B60R 21/2176 280/728.2 |
| 6,726,242 | B2 * | 4/2004 | Moon | B60R 21/239 280/739 |
| 6,877,765 | B2 * | 4/2005 | Rose | B60R 21/217 280/743.1 |
| 7,823,909 | B2 * | 11/2010 | Williams | B60R 21/217 280/732 |
| 2001/0052689 | A1 | 12/2001 | Adomeit et al. | |
| 2009/0096191 | A1 | 4/2009 | Williams et al. | |

FOREIGN PATENT DOCUMENTS

| | | | |
|---|---|---|---|
| EP | 0785111 | A2 * | 1/1997 |
| EP | 1186484 | | 3/2002 |
| EP | 1186484 | A2 | 3/2002 |
| JP | 3279643 | B2 | 4/2002 |

* cited by examiner

Fig. 1
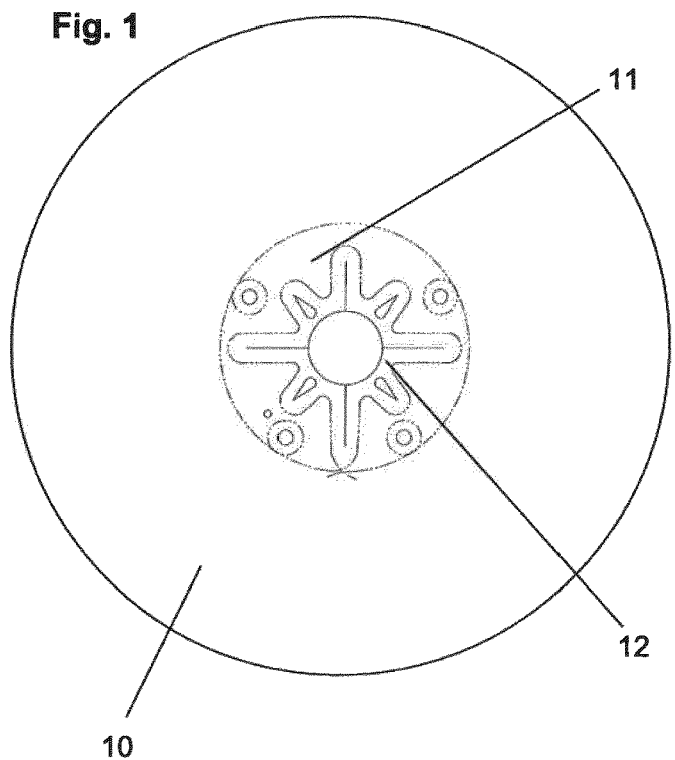
Fig. 2
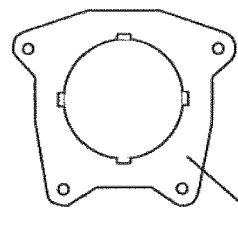
Fig. 3
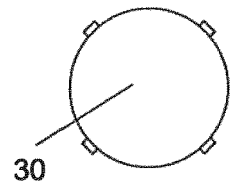
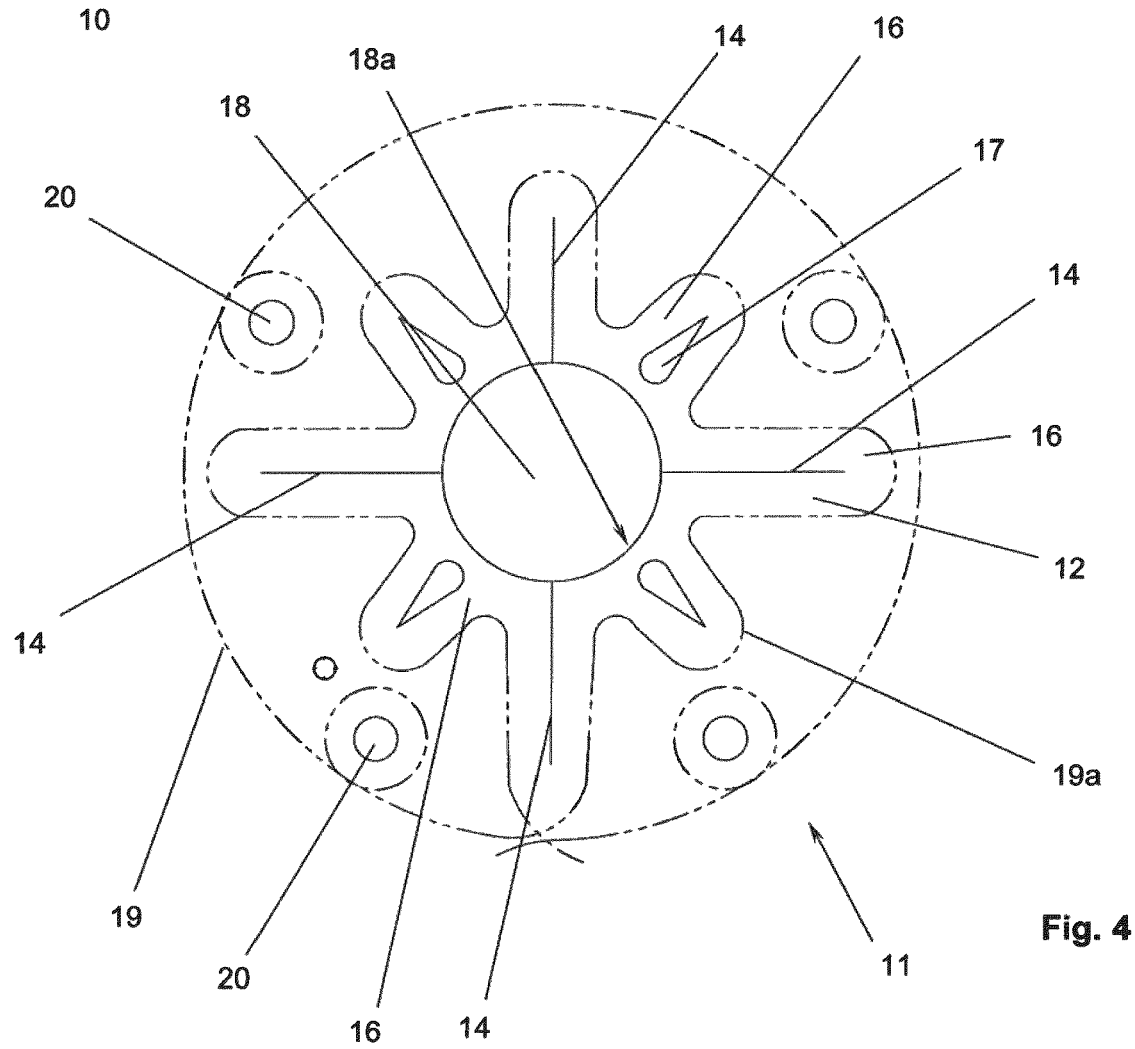
Fig. 4

AIRBAG, AIRBAG ASSEMBLY AND METHOD FOR ASSEMBLING AN AIRBAG ASSEMBLY

The invention relates to an airbag according to the preamble of claim 1, to an airbag assembly according to claim 10 and to a method for assembling this airbag assembly according to claim 13.

The invention described herein relates in the first place to frontal airbags, especially to driver airbags being located inside a steering wheel of a vehicle, but is not limited to the same. But, when the prior art is described now reference is only made to driver airbags and driver airbag assemblies.

Such a driver airbag assembly always comprises an airbag having an outer skin and an inflator assembly, wherein the outer skin of the airbag and the inflator assembly are connected to one another. This airbag assembly is usually connected to an accommodation structure having a housing but this is not of interest in this application, so only the structure of the airbag and the structure of an airbag assembly comprising such an airbag and an inflator assembly are discussed here. The outer skin of such an airbag is most often comprised of a bottom layer and a top layer such that the bottom layer of the deployed airbag is supported by the steering wheel and the top layer is the impact layer facing the driver. Since the outer skin of the airbag is basically closed, it of course has an inner side and an outer side.

The inflator assembly most often comprises an inflator with an inflator body, and a flange extending from this inflator body. Often, the inflator body extends into the airbag, such that a first section of the inflator body is located inside the outer skin and a second section of the inflator body is located outside the outer skin. For this reason, the outer skin, namely the bottom layer, comprises an inflator attachment region with an opening structure for the inflator. Commonly, this structure is simply a hole conforming to a cross section of the inflator body (which is usually a circle). Often, the flange is located inside the outer skin and studs extend from this flange through attachment holes in the outer skin near the hole for the inflator, such that the airbag is attached to the inflator assembly via these studs. For safety reasons it is usually preferred that the inflator (which is usually a pyrotechnic gas generator) is attached to the airbag just before the whole airbag module is assembled, such that there is no need to safely store the airbag assembly for further assembly steps.

Starting from this prior art it is an object of the invention to provide an airbag and an airbag assembly with such an airbag that can easily be assembled with a high degree of automatisation.

This task is solved by an airbag with the features of claim 1 and by an airbag assembly with the features of claim 10. A method for assembling this airbag assembly is defined in claim 13.

The basic idea of the invention is to provide the inflator and the flange that is attached to this inflator when the airbag assembly is completely assembled in two separate parts, such that it is possible to first attach or pre-assemble the flange to the outer skin of the airbag and then attach the inflator to the flange. The flange is located on the inner side of the outer skin such that the inflator must be moved through the opening structure of the outer skin during the assembly process. In principle the opening structure could be in form of a hole that is simply large enough, but in this case the airbag would lose too much gas when inflated. So, according to the invention, the opening structure comprises at least two basically radially extending cut-outs, especially slits, so that the attachment region has at least two flap sections being separated by those cut-outs. These flap sections can be pulled apart from one another in radial direction such that the opening structure is enlarged during the assembly of the inflator to the flange. For this "pulling outward process" an automatic handling apparatus can be used and for this it is preferred that each flap section comprises a handling means, preferably in form of a handling hole.

When the assembly is completed, the flap sections usually lie against the generating surface of the inflator body and sufficient gas tightness is achieved.

Figure 6:
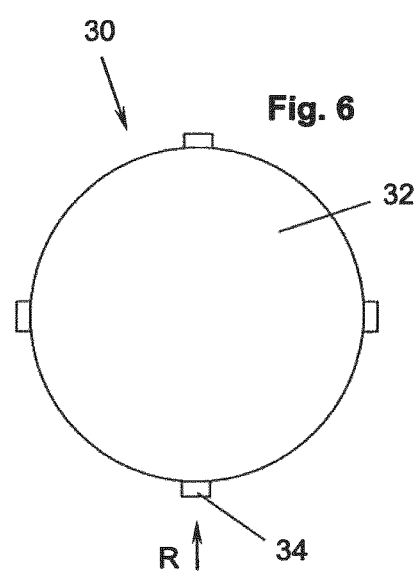
Figure 7:
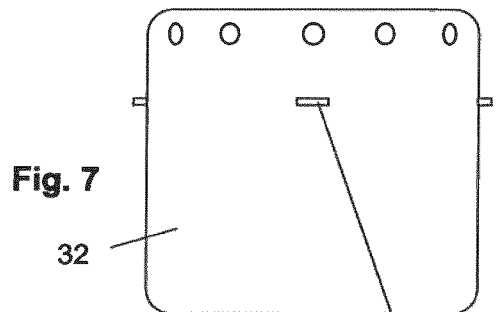
Figure 8:
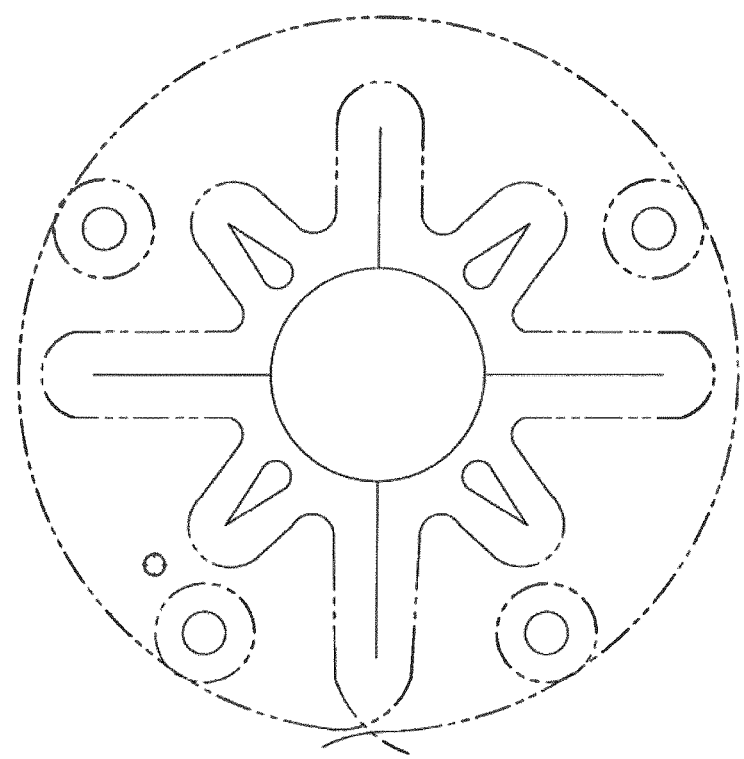
Figure 9:
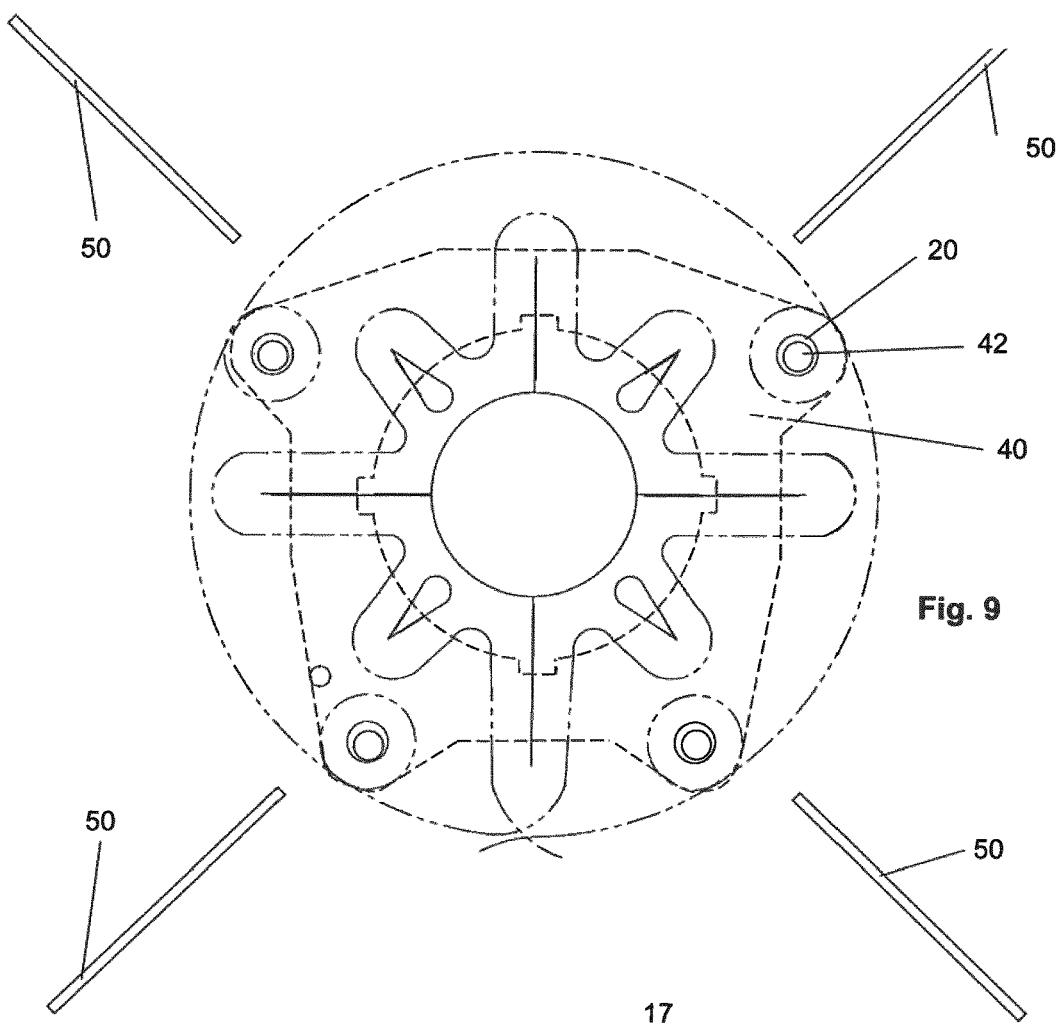
Figure 10:
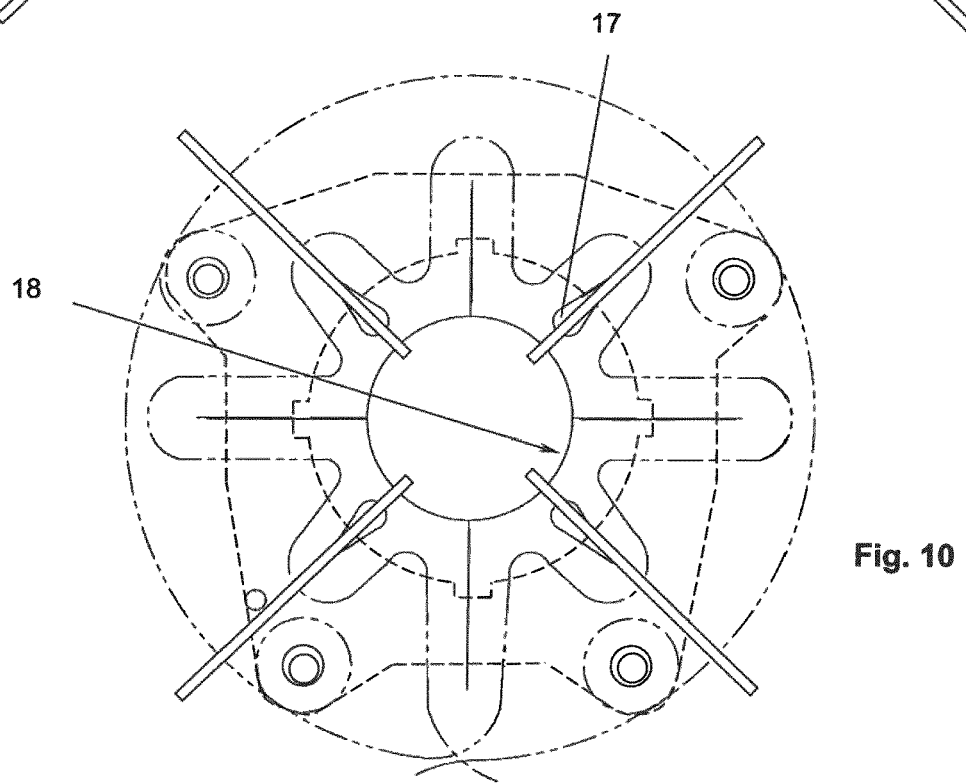
Figure 11:
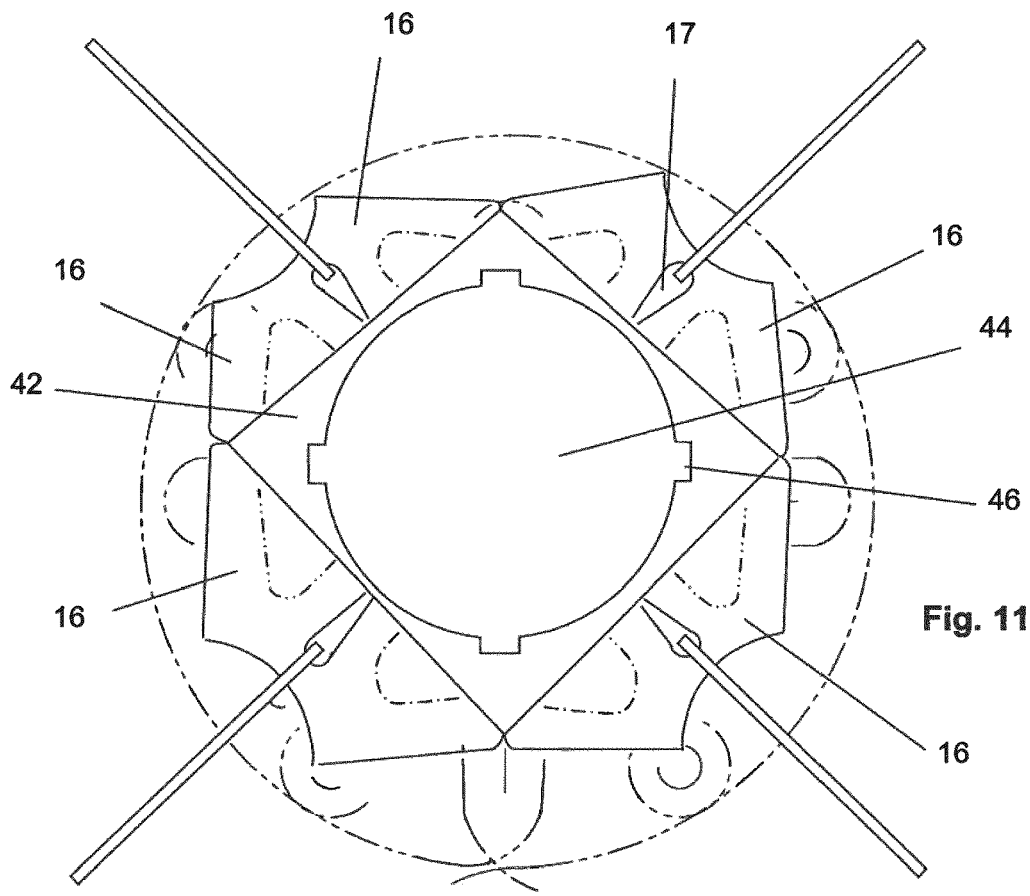
Figure 12:
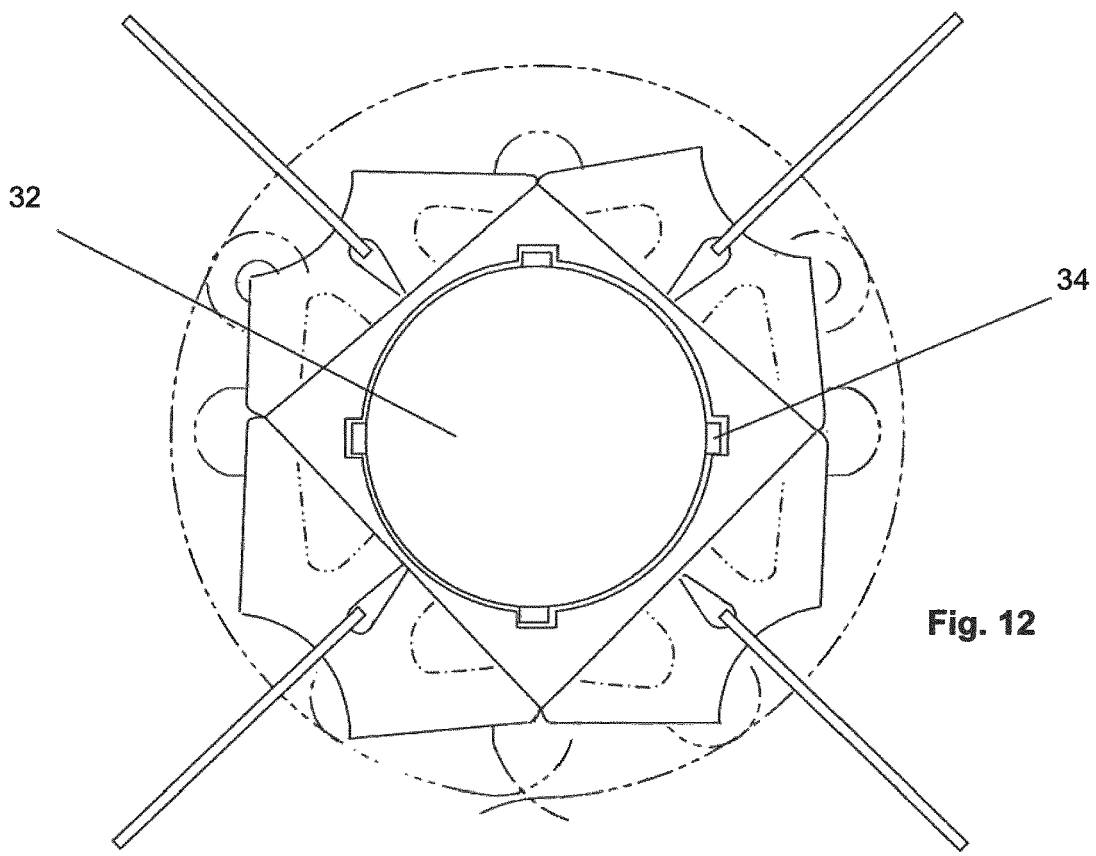
Figure 13:
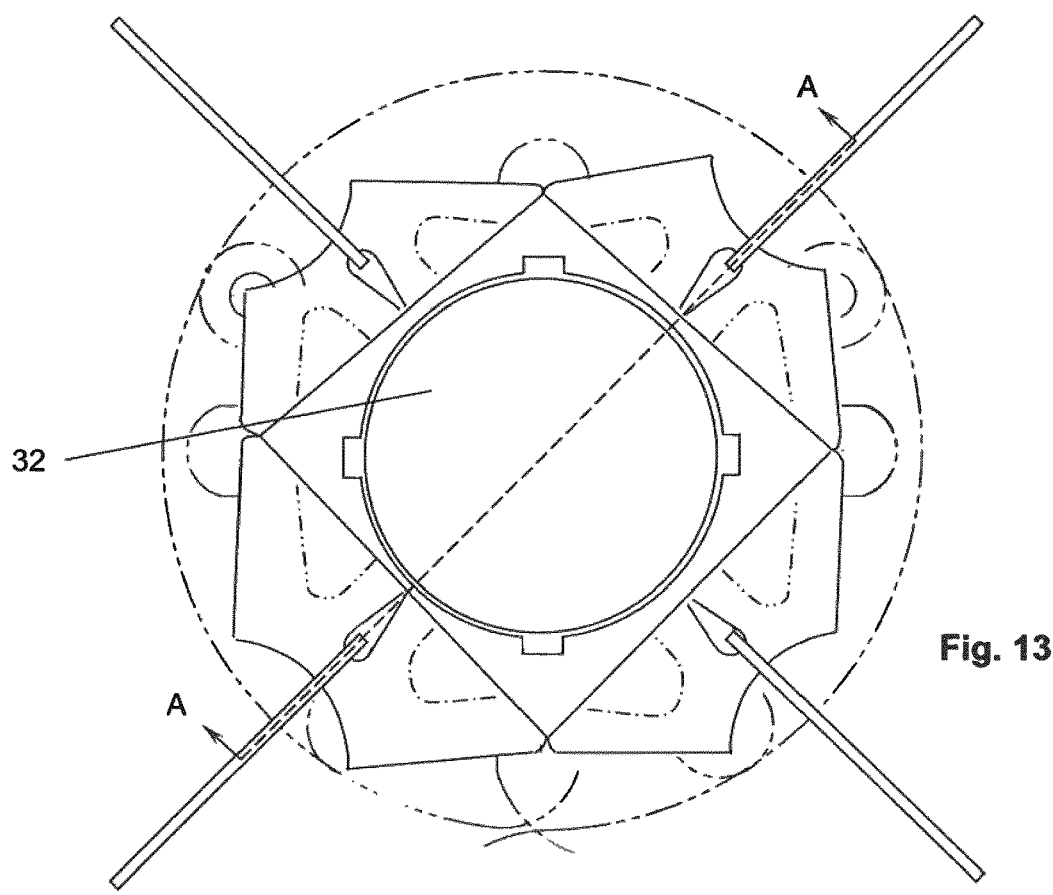
Figure 14:
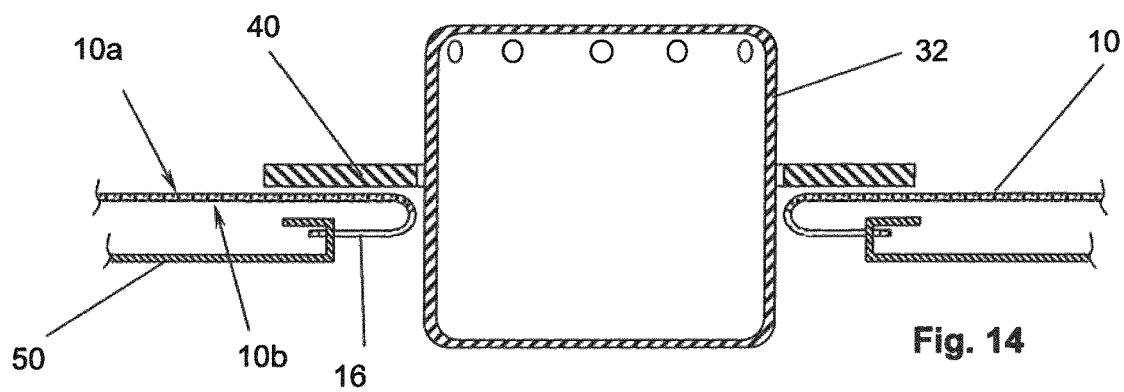
Figure 15:
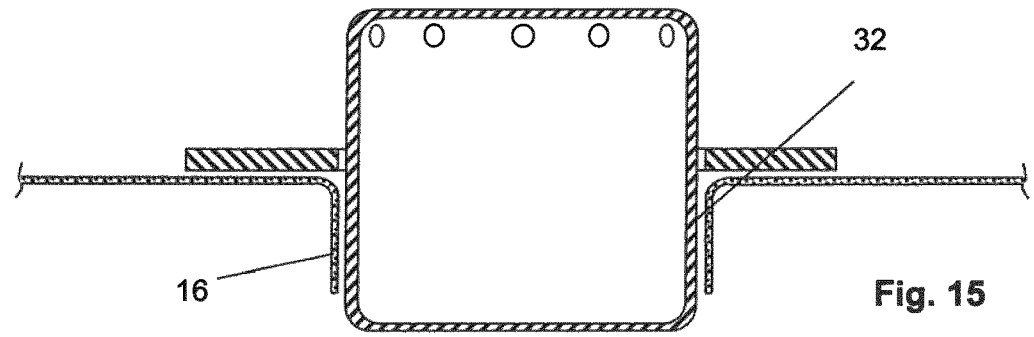
Figure 16:
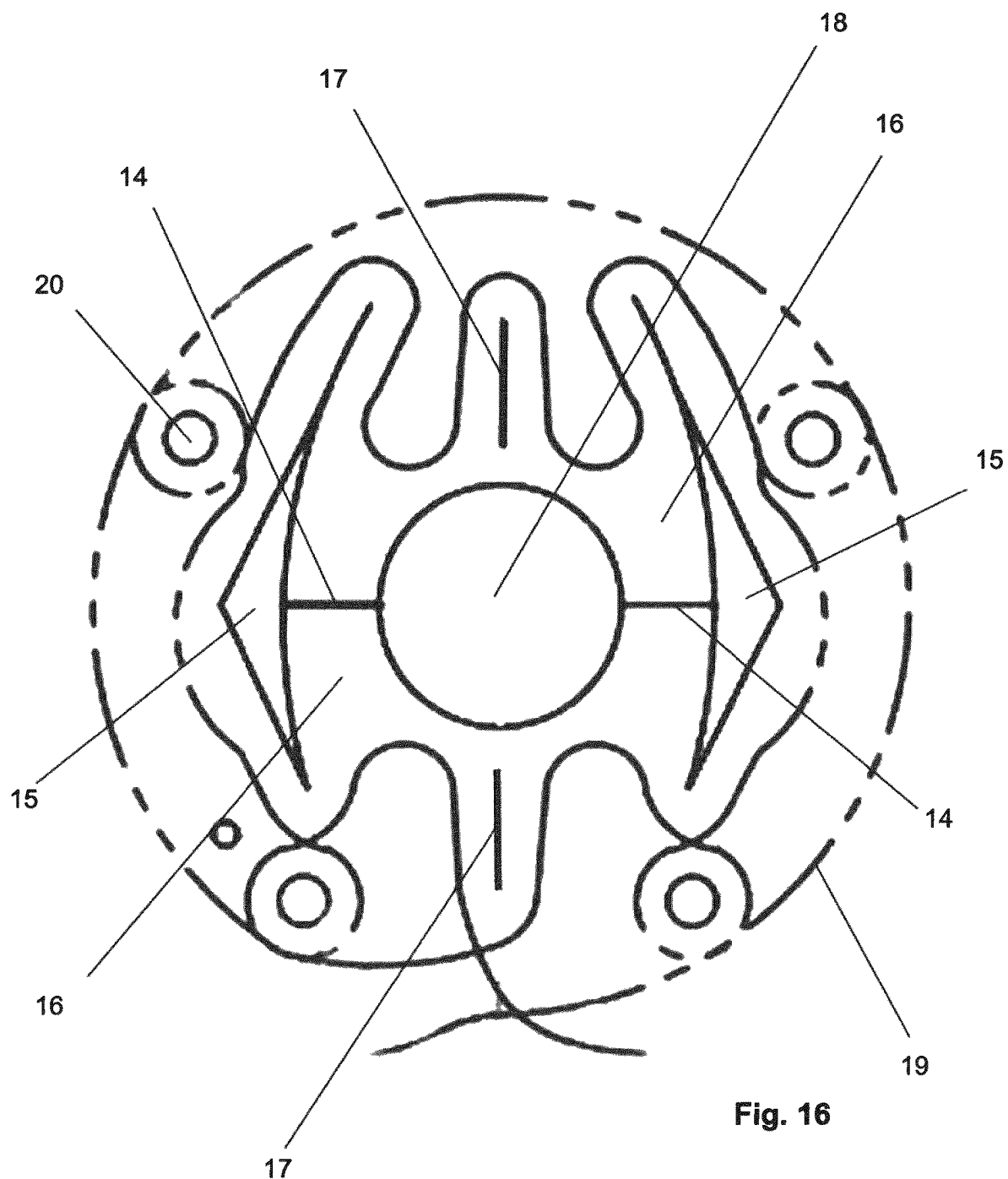

The invention will now be described by means of a preferred embodiment in view of the figures. The figures show:

FIG. 1 a plan view onto the bottom layer of an outer skin of an airbag,

FIG. 2 a flange,

FIG. 3 an inflator in a plan view from the bottom,

FIG. 4 the inflator attachment region of the outer skin shown in FIG. 1, FIG. 5 the flange of FIG. 2 in an enlarged representation in the same scale as the inflator attachment region of FIG. 4, FIG. 6 the inflator of FIG. 4 in a scale according to FIGS. 4 and 5, FIG. 7 a side view onto the inflator of FIG. 6 from the direction R, FIG. 8 again the inflator attachment region of FIG. 4 but without reference signs, FIG. 9 the inflator attachment region of FIG. 8 with the flange of FIG. 5 placed inside the outer skin such that it is shown in broken lines, and four hooks of a handling machine, FIG. 10 what is shown in FIG. 9 after the hooks have engaged into the handling holes of the flap sections of the outer skin, FIG. 11 what is shown in FIG. 10 after the flap sections have been pulled outwardly by means of the hooks, such that a part of the flange can be seen, FIG. 12 what is shown in FIG. 11 and the inflator body being arranged in the central hole of the flange, FIG. 13 what is shown in FIG. 12 after the inflator body has been locked to the flange by means of a rotational movement, FIG. 14 a sectional view taken along plane A-A in FIG. 13, FIG. 15 what is shown in FIG. 14 after the hooks have been removed, and FIG. 16 another embodiment of an attachment region.

FIG. 1 shows an outer skin 10 of an airbag in a plan view from "the bottom". FIG. 4 shows a detail of FIG. 1, namely the inflator attachment region 11. This inflator attachment region 11 has attachment holes 20, for studs that extend from a flange (the flange will be described later). In this embodiment, a portion of a seam 19 extends around the inflator attachment region and the attachment holes 20. Often, the inflator attachment region 11 is at least partially multiple layered in order to make this attachment region sturdy enough. An opening structure 12 is provided inside the inflator attachment region 11. This opening structure 12 comprises a central hole 18 and four slits 14 extending from this central hole 18 in radial directions. These slits 14 are located onto two straight lines which are perpendicular to one another, wherein the intersection of those two lines define the center of the central hole 18. Such symmetry is preferred, but not strictly mandatory.

The four slits 14 define four flap sections 16 extending from the central hole 18. Each of those flap sections 16 comprises a handling hole 17 which has a teardrop shape. A section of the seam 19 extends around the slits 14 and the handling holes 17. As is shown it is preferred that one continuous seam 19 is provided because this makes the production efficient, but in principle it would also be possible to provide distinct seams.

FIGS. 2 and 5 show a flange 40. Four studs 42 are arranged on the flange 40 in a pattern that conforms to the pattern of the attachment holes 20. The studs 42 can be looked at as belonging to the flange or as being attached to the flange. The flange 40 has a central hole 44 and since in the embodiment shown, an inflator body 32, which will be described later, and the flange 40 are connected to one another by means of a bayonet coupling, recesses 46 extend from the central hole 44. The flange 40 (except the studs) is usually a flat part of stamped metal.

FIGS. 6 and 7 show an inflator 30 with an inflator body 32, which is basically in form of a cylinder. Attachment protrusions 34 extend from the inflator body 32 as parts of the just mentioned bayonet coupling.

In a first assembly step the flange 40 is located on the inner side of the outer skin in such a way that the studs 42 extend through the attachment holes 20. Additional mounting means between the flange 40 and the outer skin 10 can be provided if desired. For example, the flange 40 could be glued to the inner side of the outer skin. The flange can be inserted into the outer skin through the opening structure 12. Alternatively it is possible to first attach the flange 40 to the bottom layer of the outer skin of the airbag before sewing the top layer to the bottom layer.

FIG. 9 shows the situation in which the flange is located inside the outer skin of the airbag and the studs 42 extend through the attachment holes 20. One can see that the central hole 44 of the flange 40 is located behind the opening structure 12 of the inflator attachment region 11. Additionally in FIG. 9 four hooks 50 are schematically shown, each of those hooks 50 being assigned for engaging into one of the handling holes 17. FIG. 9 shows those hooks 50 in a radially outward position.

FIG. 10 shows the same as FIG. 9 after the hooks 50 have been moved radially inward, then towards the outer skin of the airbag and again a little radially outward, such that the hook sections of the hooks extend around the inner edge 18*a* of central hole 18 and into the handling holes 17.

In this state, the hooks 50 are again moved radially outwards such that the flap sections 16 open until the central hole 44 with its recesses 46 is no longer covered by the outer skin 10. This is shown in FIG. 11.

Now, the inflator body 32 can be inserted into the central hole 44 of the flange 40 and turned, such that the bayonet coupling is closed (please see FIGS. 12 and 13). Here it should be noted that a bayonet coupling between the inflator 30 and the flange 40 is a preferred embodiment but that other kinds of attachments between inflator 30 and flange 40 can also be provided.

Now, the hooks 50 are disengaged from the flap sections 16, such that they bent back until they abut against the generating surface of the inflator body 32 (FIG. 15). The assembly process of the airbag assembly is finished now.

FIG. 16 shows a second embodiment of the inflator attachment region 11. The main difference to the first embodiment is that only two slits 14 and thus only two flap sections 16 are provided. The slits 14 end in additional cut-outs 15 because otherwise the flap sections could not be pulled outwardly. This additional cut-outs can be covered by the flange, such that a sufficient gas-tightness can be reached.

The other difference to the first embodiment is, that the handling holes 17 are slit-shaped, but it is to be noted that the shape of the handling holes is a matter of choice.

One sees that a simple assembly method is provided that can be completely automated and which allows a very late attachment of the inflator.

LIST OF REFERENCE NUMBERS

10 outer skin of airbag
10*a* inner side
10*b* outer side
11 inflator attachment region
12 opening structure
14 slit
15 additional cut-out
16 flap section
17 handling hole
18 central hole
18*a* inner edge
19 seam
19*a* section of seam surrounding the opening structure
20 attachment hole
30 inflator
32 inflator body
34 attachment protrusion for bayonet coupling
40 flange
42 studs
44 central hole
46 recess for bayonet coupling
50 hook

The invention claimed is:

1. Airbag comprising an outer skin having an inner side and an outer side, wherein an opening structure for an inflator is provided in an inflator attachment region of the outer skin, wherein the opening structure comprises at least two basically radially extending cut-outs, so that the attachment region has at least two flap sections being separated by the cut-outs, wherein the inflator attachment region further comprises attachment holes configured to receive studs therethrough, the attachment holes being outside the opening structure, and wherein each flap section comprises a handling hole, wherein each of the handling holes is configured to facilitate separation of the flap sections.

2. Airbag according to claim 1, wherein three cutouts are provided, so that the attachment region comprises three flap sections.

3. Airbag according to claim 1, wherein four cutouts are provided, so that the attachment region comprises four flap sections.

4. Airbag according to claim 1, wherein the cut-outs are slits, wherein each slit defines a straight line and all straight lines have a common central point.

5. Airbag according to claim 1, wherein the opening structure further comprises a central hole from which the cut-outs extend.

6. Airbag according to claim 1, wherein the opening structure is at least partially, preferably completely surrounded by a seam or a section of a seam.

7. Airbag assembly comprising an airbag according to claim 1 and an inflator assembly having an inflator with an inflator body having a generating surface, said inflator body extending through the opening structure such that a first section of the inflator body is located inside the outer skin, and a second section of the inflator body is located outside the outer skin, wherein at least a part of the flap sections lie against the generating surface of the inflator body.

8. Airbag assembly according to claim 7, wherein the inflator assembly further comprises a flange being located on the inner side of the outer skin, wherein said flange has a central hole.

9. Airbag assembly according to claim 7, wherein the inflator assembly further comprises a flange being located on the inner side of the outer skin, wherein the inflator attachment region further comprises attachment holes outside the opening structure and further comprising studs extending from the flange through the attachment holes.

10. Method for assembling the airbag assembly according to claim 7, comprising the following steps:
providing a sub-assembly comprising the outer skin and a flange being located on the inner side of the outer skin,
providing the inflator,
pulling the flap sections apart from one another from the outside, such that an insertion opening is generated or enlarged,
pushing a part of the inflator body through the insertion opening, and
attaching the inflator body to the flange.

11. Airbag according to claim 1, wherein the handling holes have a distinct shape from the attachment holes.

12. Airbag according to claim 11, wherein the handling holes have a teardrop shape.

13. Airbag according to claim 1, and further comprising an inflator assembly having an inflator with an inflator body having a generating surface, said inflator body extending through the opening structure such that a first section of the inflator body is located inside the outer skin, and a second section of the inflator body is located outside the outer skin, wherein at least a portion of the flap sections lie against the second section of the inflator body outside of the airbag.

* * * * *